United States Patent
Park et al.

(10) Patent No.: US 9,049,679 B2
(45) Date of Patent: Jun. 2, 2015

(54) LOCATION MEASUREMENT APPARATUS AND METHOD

(71) Applicant: Electronics and Telecommunications Research Institute, Daejeon (KR)

(72) Inventors: Jae-Bok Park, Daejeon (KR); Duk-Kyun Woo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 158 days.

(21) Appl. No.: 13/731,464

(22) Filed: Dec. 31, 2012

(65) Prior Publication Data
US 2014/0004878 A1    Jan. 2, 2014

(30) Foreign Application Priority Data
Jun. 28, 2012 (KR) .......................... 10-2012-0070117

(51) Int. Cl.
*H04W 64/00* (2009.01)
*H04Q 5/22* (2006.01)
*H04L 12/26* (2006.01)

(52) U.S. Cl.
CPC .................................... *H04W 64/00* (2013.01)

(58) Field of Classification Search
CPC .................................................. H04W 64/00
USPC ........................ 455/456.1; 340/10.1; 370/245
See application file for complete search history.

(56) References Cited

U.S. PATENT DOCUMENTS

| | | | |
|---|---|---|---|
| 2004/0198392 A1* | 10/2004 | Harvey et al. | 455/456.1 |
| 2010/0066503 A1* | 3/2010 | Rhie et al. | 340/10.1 |
| 2010/0103825 A1* | 4/2010 | Taaghol et al. | 370/245 |
| 2014/0073349 A1* | 3/2014 | Schunk | 455/456.1 |

FOREIGN PATENT DOCUMENTS

KR    10-2008-0103254 A    11/2008

OTHER PUBLICATIONS

Chong Liu et al., "Range-Free Sensor Localization with Ring Overlapping Based on Comparison of Received Signal Strength Indicator", IJSNet, Jan. 2007, pp. 399-413, vol. 2.
Lance Doherty et al., "Convex Position Estimation in Wireless Sensor Networks", INFOCOM 2001, Twentieth Annual Joint Conference of the IEEE Computer and Communications Societies, Proceedings, IEEE, 2001, pp. 1655-1663, vol. 2.
Ki Young Lee, "A Study on Accuracy Enhancement of Indoor Local Positioning System Based on Zigbee", Journal of Korean Institute of Information Technology, May 2010, pp. 85-91, vol. 8, No. 5.

* cited by examiner

*Primary Examiner* — Jinsong Hu
*Assistant Examiner* — Jean Chang
(74) *Attorney, Agent, or Firm* — Rabin & Berdo, P.C.

(57) ABSTRACT

Disclosed herein are a location measurement method and apparatus. The apparatus includes a first grading unit, a first presumed line calculation unit, a second grading unit, a second presumed lined calculating unit, a presumed location calculation unit, and a final location calculation unit. The first grading unit determines the grade of a first RSSI. The first presumed line calculation unit calculates the range of the object from a first node based on the grade of the first RSSI. The second grading unit determines the grade of a second RSSI. The second presumed line calculating unit calculates the range of the object from a second node based on the grade of the second RSSI. The presumed location calculation unit calculates two presumed locations. The final location calculation unit determines one of the two presumed locations to be the final location of the object.

8 Claims, 6 Drawing Sheets

LOCATION MEASUREMENT APPARATUS AND METHOD

CROSS REFERENCE TO RELATED APPLICATION

This application claims the benefit of Korean Patent Application No. 10-2012-0070117, filed on Jun. 28, 2012, which is hereby incorporated by reference in its entirety into this application.

BACKGROUND OF THE INVENTION

1. Technical Field

The present invention relates generally to a location measurement apparatus and method and, more particularly an apparatus and method that classify irregular communication RSSIs into three levels using two sensing nodes in a defense sensor network environment having limited resources and more accurately measure the location of an object for each of the levels.

2. Description of the Related Art

Location information is a fundamental element that enables a user or an object to recognize a surrounding environment, and thus is a core element in ubiquitous computing. Therefore, a sensor network-based location recognition technique is attracting attention as a sensor network-related key element technology in a ubiquitous defense ("U-defense") environment.

However, existing studies are intended to calculate and track a location using only one or more close nodes within a communication range in an environment in which a sufficient number of sensor nodes have been provided. In particular, if the number of nodes participating in location measurement in a resource-limited defense sensor network environment is not sufficient, the accuracy of the tracking of the location may be very low or the tracking of the location may be impossible. Accordingly, the accuracy of the tracking of the location must be ensured using a surrounding environment.

Methods of measuring the location of an object may be classified into a range-based method and a range-free method.

The range-based method is a method of estimating a range value using an ultrasonic sensor or a received signal strength indication (RSSI) device and then calculating a location based on the estimated range value. In particular, the method of measuring a location using the RSSI device is suitable for a resource-limited sensor node. However, such an RSSI device involves (non-negligible) errors because of problems such as multi-path fading.

Meanwhile, the range-free method is a method of approximately measuring the location of an object based on whether or not communication between sensor nodes is possible without using any alternative device. However, when the density of the sensor nodes is low, the range-based method that calculates a location based on a range value using a small number of sensor nodes may be more effective than the range-free method.

Accordingly, the range-based method and the range-free method have their own advantages/disadvantages in the measurement of the location of an object in defense sensor network environments. In other words, a novel method for improving the accuracy of the calculation of a location by integrating the advantages of the range-based method and the range-free methods described above is still required.

The conventional location measurement method calculates a location generally using only one or more close nodes within a communication range. However, if there are a smaller number of nodes participating in the calculation of a location in a resource-limited defense sensor network environment, in particular in a sensor network environment with a low density, the accuracy of the calculation of a location may be very low or the calculation of a location may be impossible.

SUMMARY OF THE INVENTION

Accordingly, the present invention has been made keeping in mind the above problems occurring in the prior art, and an object of the present invention is to provide an apparatus and method that classify irregular communication RSSIs into three levels using two sensing nodes in a resource-limited defense sensor network environment and more accurately measure the location of an object for each level.

In order to accomplish the above object, the present invention provides a location measurement method, including determining the grade of a first received signal strength indication (RSSI) corresponding to an object which communicates with a first node; calculating the range of the object from the first node based on the grade of the first RSSI; determining the grade of a second RSSI corresponding to the object that communicates with a second node; calculating the range of the object from the second node based on the grade of the second RSSI; calculating two presumed locations based on the ranges from the first and second nodes; and determining one of the two presumed locations to be the final location of the object by predicting the movement of the object.

The grade may be classified as a first, second or third level based on the RSSI.

The first level may have a higher signal strength than the second level, and the second level may have a higher signal strength than the third level.

The first level may be a level which allows the range of the RSSI to be directly considered and applied to calculation of the range from the first or second node, and the second and third levels may be levels which are used to calculate the range from the first or second node by apply preset ranges.

The calculating two presumed locations may include calculating two presumed regions by restricting coverage using first and second presumed lines and removing a region in which the object is not present via the restricted coverage; and calculating the two presumed locations based on centers of the two presumed regions.

The determining one of the two presumed locations to be a final location of the object may include estimating a velocity of the object using previous location information of the object and the two presumed locations; and calculating the final location of the object using the estimated velocity of the object.

In order to accomplish the above object, the present invention provides a location measurement apparatus, including a first grading unit configured to determine the grade of a first RSSI corresponding to an object which communicates with a first node; a first presumed line calculation unit configured to calculate the range of the object from the first node based on the grade of the first RSSI; a second grading unit configured to determine the grade of a second RSSI corresponding to the object which communicates with a second node; a second presumed lined calculating unit configured to calculate the range of the object from the second node based on the grade of the second RSSI; a presumed location calculation unit configured to calculate two presumed locations based on the ranges from the first and second nodes; and a final location calculation unit configured to determine one of the two presumed locations to be the final location of the object by predicting the movement of the object.

The grade may be classified as a first, second or third level based on the RSSI.

The first level may have a higher signal strength than the second level, and the second level may have a higher signal strength than the third level.

The first level may be a level which allows the range of the RSSI to be directly considered and applied to calculation of the range from the first or second node, and the second and third levels may be levels which are used to calculate the range from the first or second node by apply preset ranges.

The presumed location calculation unit may calculate two presumed regions using a first presumed line and a second presumed line, and may calculate the two presumed locations based on the centers of the two presumed regions.

The final location calculation unit may estimate a velocity of the object using previous location information of the object and the two presumed locations, and may determine the final location of the object using the estimated velocity of the object.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
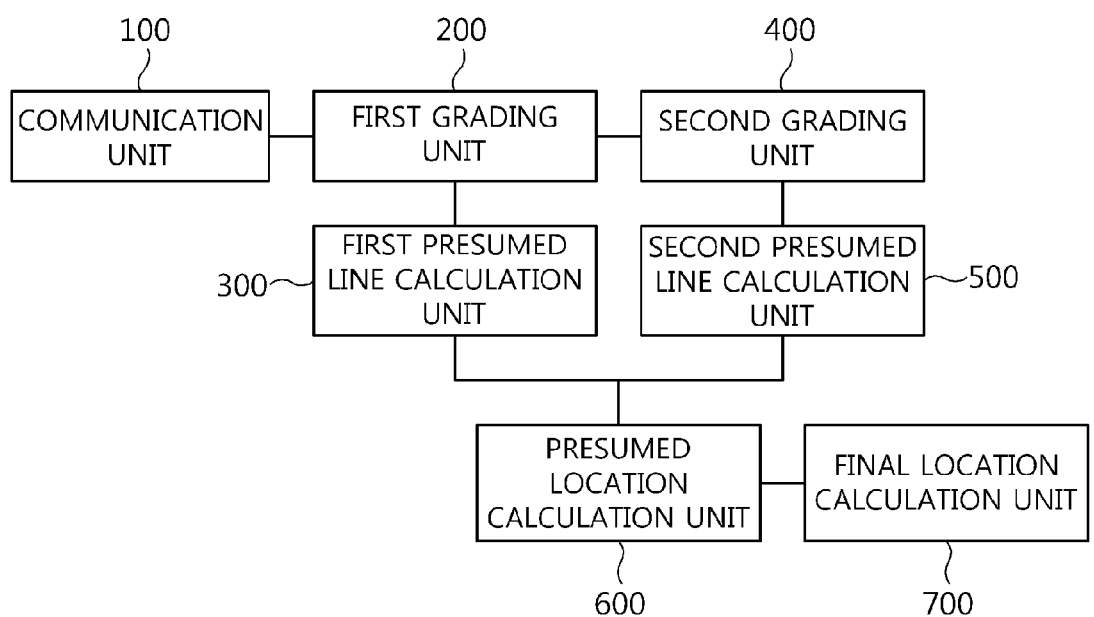
FIG. 1 is a diagram schematically illustrating the configuration of a location measurement apparatus in a defense environment according to an embodiment of the present invention.

The present invention will be described in detail below with reference to the accompanying drawings. Repeated descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

Hereinafter, a location measurement apparatus and method according to embodiments of the present invention will be described in detail with reference to the accompanying drawings.

First, the present invention provides a technique of accurately calculating the location of an object using only two anchor nodes, that is, first and second nodes, in a defense sensor network environment with lots of restrictions.

Figure 2:
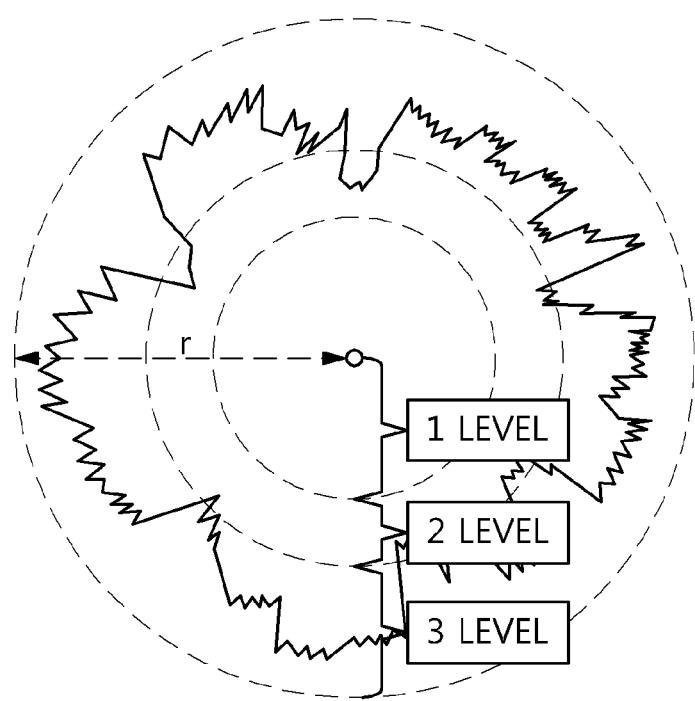
FIG. 2 is a diagram illustrating the results of the grading of RSSIs according to an embodiment of the present invention.

FIG. 1 is a diagram schematically illustrating the configuration of a location measurement apparatus in a defense environment according to an embodiment of the present invention. FIG. 2 is a diagram illustrating the results of the grading of RSSIs according to an embodiment of the present invention.

Referring to FIG. 1, the location measurement apparatus in a defense environment includes a communication unit 100, a first grading unit 200, a first presumed line calculation unit 300, a second grading unit 400, a second presumed line calculation unit 500, a presumed location calculation unit 600, and a final location calculation unit 700.

The communication unit 100 communicates with an object.

The first grading unit 200 determines the grade of the first received signal strength indication (hereinafter referred to as "RSSI") of an object which communicates with a first node. The first grading unit 200 may obtain a range value corresponding to the grade of the first RSSI determined as described above.

For this purpose, the first grading unit 200 may classify RSSIs in advance, and then include the results of the classification (that is, graded results).

Referring to FIG. 2, the first grading unit 200 may classify the range ('r' in FIG. 2) of RSSIs into a first level (level 1), a second level (level 2), and a third level (level 3). 'r' may be the range which is predetermined.

Level 1 refers to a level present at the closest range from the object, and has a higher RSSI than levels 2 and 3. Therefore, since the range of an RSSI measured at level 1 is deemed to be the most accurate range from the object, the range value of the RSSI may be directly considered and applied to the calculation of the location of the object. That is, the range from the nodes may be decided in inverse proportion to the RSSI.

Level 2 is used to detect the object in the range of 0.4r to 0.6r, and thus corresponds to a level with an accuracy equal to or higher than 80%. Accordingly, if level 2 is used, an object that cannot be detected using levels 1 and 3 may be successfully detected. Furthermore, level 2 sets the range of RSSI to 0.5r, and uses the set range to calculate the location.

Level 3 is used to detect an object in the range of 0.6r to 1.0r, and thus corresponds to a level with a lower accuracy than level 1 and level 2. Level 3 sets the range of RSSI to 0.8r, and uses the set range to calculate the location.

The first presumed line calculation unit 300 calculates the first presumed line using a range value corresponding to the grade of the first RSSI determined by the first grading unit 200. Here, if the grade of the RSSI is level 1, the RSSI is directly applied to the range value of the RSSI. If the grade of the RSSI is level 2, 0.5r is applied to the range value of the RSSI. If the grade of the RSSI is level 3, 0.8r is applied to the range value of the RSSI.

The second grading unit 400 determines the grade of the second RSSI of an object which communicates with a node other than the first node, that is, a second node.

The second presumed line calculation unit 500 calculates the second presumed line using a range value corresponding to the grade of the second RSSI determined by the second grading unit 400.

The presumed location calculation unit 600 calculates two presumed regions using a first presumed line and a second presumed line, and calculates the two presumed locations based on the center of the two calculated presumed regions.

More specifically, the presumed location calculation unit 600 restricts coverage using the first and second presumed lines, and removes a region in which the object is not present via the restricted coverage, thereby calculating two presumed regions.

The final location calculation unit 700 predicts the movement of the object, and determines any one of the two presumed locations to be the final location of the object.

In detail, the final location calculation unit 700 calculates straight-line distances between the two presumed locations and the previous location of the object, and calculates the final location using the calculated straight-line distances and the estimated velocity of the object. Here, the final location calculation unit 700 calculates the estimated velocity of the object using the RSSI of a specific node closest to the object, which is measured immediately after the RSSI of the object.

Next, a method of measuring the location of an object when node A detects the object at level 1 and node B detects the object at level 2 will be described in detail with reference to FIG. 3.

Figure 3:
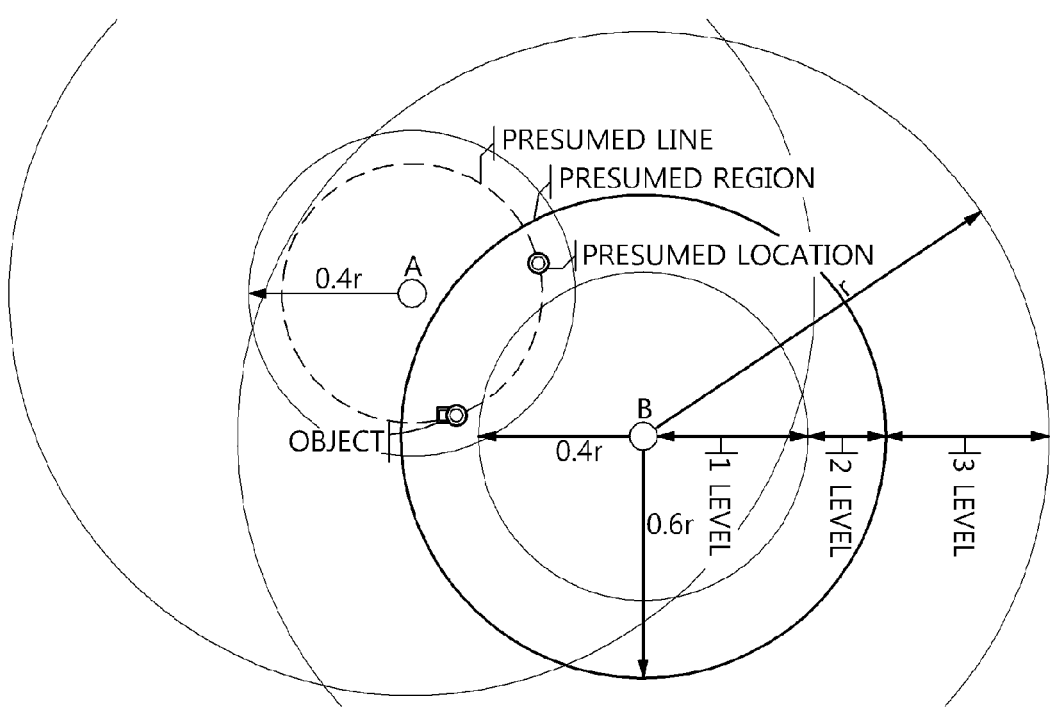
FIG. 3 is a reference diagram illustrating a method of measuring the location of an object when node A detects the object at level 1 and node B detects the object at level 2 according to an embodiment of the present invention.

FIG. 3 is a reference diagram illustrating the method of measuring the location of an object when node A detects the object at level 1 and node B detects the object at level 2 according to an embodiment of the present invention.

Referring to FIG. 3, if the distance between node A and the object is within 0.4r, the highest reliability may be ensured. Accordingly, the location of the object must be present on the presumed line (the presumed line in FIG. 3), which is presumed using the range of RSSI.

Therefore, the location measurement apparatus may reduce a presumed region corresponding to the presumed line using the RSSI of node B that detected the object based on the presumed line.

The location measurement apparatus detects the location of the object at node A, and calculates the presumed line at level 1. Here, node B detects the object at level 2 to correspond to the location of the object. That is, the restrictions of node B mean that the object is never present at level 1 and is also not possibly present at level 3. Accordingly, the location measurement apparatus may obtain two presumed regions by removing a region in which the object cannot be present using the presumed line presumed by node A and the RSSI corresponding to the object detected at node B. Thereafter, the location measurement apparatus calculates two presumed locations based on the center points of the two presumed regions, and calculates the final location of the object based on the results of the calculation.

As described above, in order to calculate the location of an object using only two sensing nodes, for example, nodes A and B in FIG. 3, in the defense environment of a sensor network, the present invention grades the RSSI of an object and clearly determines restrictions based on the RSSI, thereby improving the accuracy of the calculation of the location.

Next, a method of measuring the location of an object when node A detects the object at level 2 and node B detects the object at level 3 will be described in detail with reference to FIG. 4.

Figure 4:
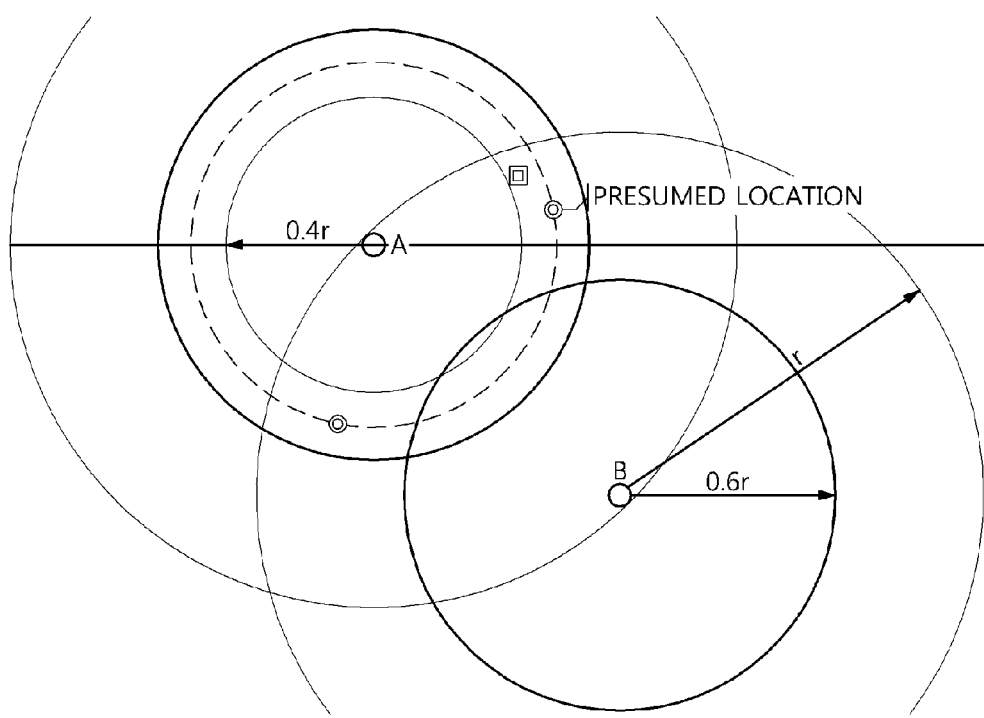
FIG. 4 is a reference diagram illustrating a method of measuring the location of an object when node A detects the object at level 2 and node B detects the object at level 3 according to an embodiment of the present invention.

FIG. 4 is a reference diagram illustrating the method of measuring the location of an object when node A detects the object at level 2 and node B detects the object at level 3 according to an embodiment of the present invention.

Referring to FIG. 4, the location measurement apparatus sets the range of RSSI to 0.5r when an object is detected in the range of 0.4r to 0.6r based on node A. That is, the location measurement apparatus calculates a presumed line using the range of the RSSI, that is, 0.5r.

As described above, the location measurement apparatus detects an object in the range of 0.4r to 0.6r and sets the range of RSSI to 0.5r based on the results of the detection, thereby enabling a presumed line to be calculated at an accuracy equal to or higher than 80%.

Furthermore, node B detects the object at level 3 to correspond to the location of the object. That is, the restrictions of node B mean that the object is never present at level 1 and is also not possibly present at level 2.

Accordingly, the location measurement apparatus may obtain two presumed regions by removing a region in which the object cannot possibly be present using the presumed line presumed by node A and the RSSI corresponding to the object detected at node B. Thereafter, the location measurement apparatus calculates two presumed locations based on the center points of the two presumed regions, and calculates the final location of the object based on the results of the calculation.

Next, a method of calculating a final location based on two presumed locations will be described below with reference to FIG. 5.

Figure 5:
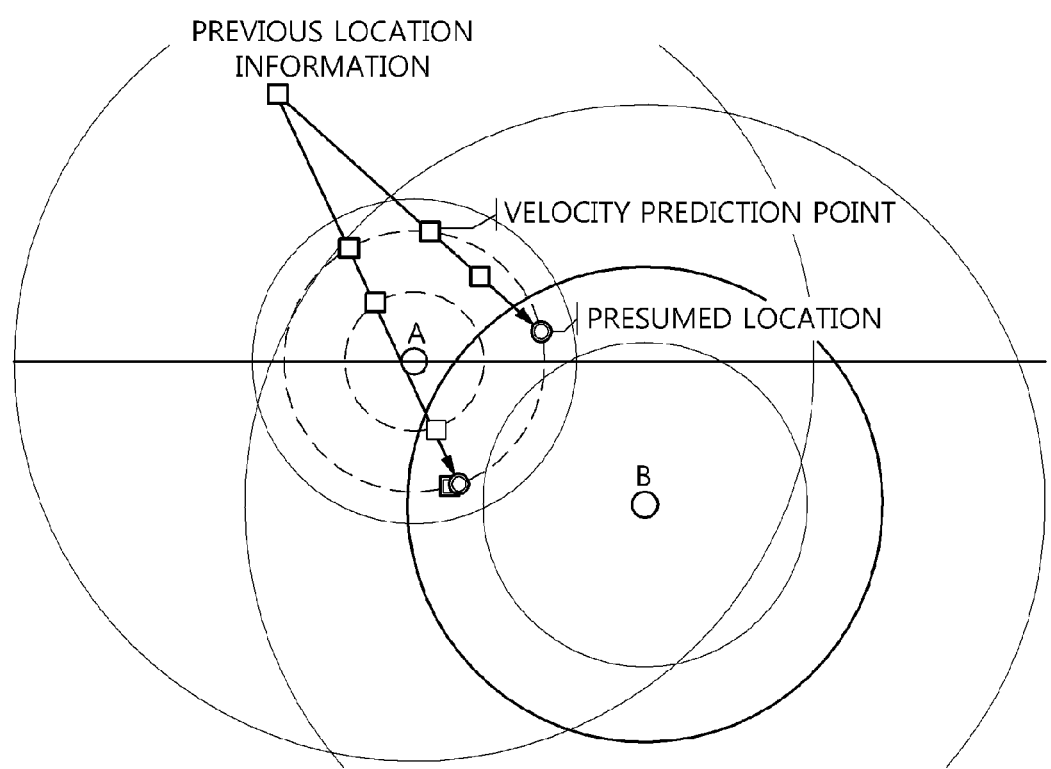
FIG. 5 is a reference diagram illustrating a method of calculating a final location based on presumed locations according to an embodiment of the present invention.

FIG. 5 is a reference diagram illustrating a method of calculating a final location based on presumed locations according to an embodiment of the present invention.

Referring to FIG. 5, the location measurement apparatus continuously detects an object at node A, and calculates the average velocity of the object using time information at the closest range from the object, time information corresponding to previous location information, the previous location information, and the location of node A. In this case, the location measurement apparatus selects a location close to the two presumed locations as a final location by connecting the previous location information and two presumed locations in a straight line and calculating a moving distance based on the estimated velocity of the object (an estimated velocity point in FIG. 5).

Next, a method of calculating a location in a defense environment will be described below with reference to FIG. 6.

Figure 6:
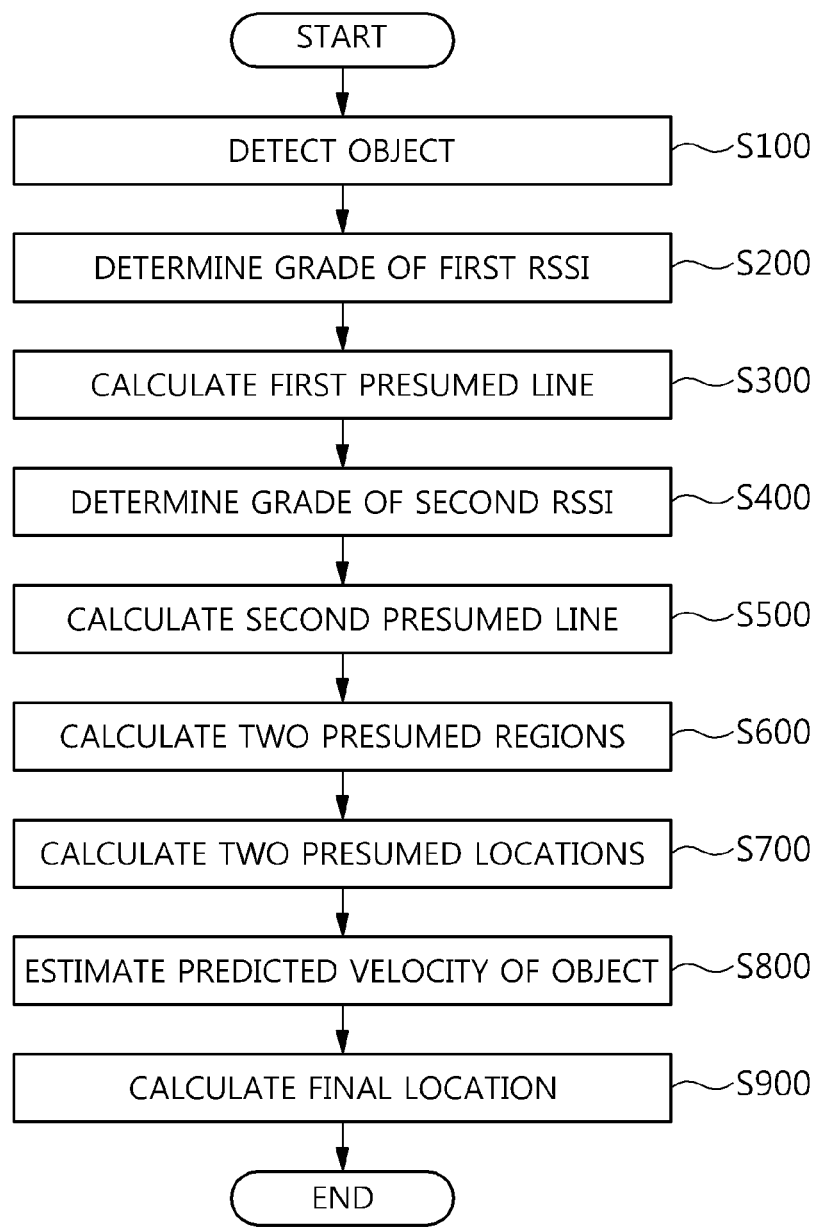
FIG. 6 is a flowchart illustrating a method of calculating a location in a defense environment according to an embodiment of the present invention.

FIG. 6 is a flowchart illustrating a method of calculating a location in a defense environment according to an embodiment of the present invention.

Referring to FIG. 6, the location measurement apparatus in a defense environment detects an object that communicates with a node at step S100.

The location measurement apparatus determines the grade of a first RSSI corresponding to the object which communicates with a first node at step S200.

The location measurement apparatus calculates a range value corresponding to the grade of the first RSSI determined at step S200, and calculates a first presumed line using the range value at step S300.

In the location measurement method in a defense environment according to the embodiment of the present invention, the RSSIs may be graded as first, second and third levels (levels 1, 2 and 3).

Since the range of the RSSI measured at level 1 is deemed to be the most accurate range from the object, the range value of the RSSI may be directly considered and applied to calculation of the location of the object.

The range of the RSSI measured at level 2 is set to 0.5r, and the range of the RSSI measured at level 3 is set to 0.8r.

The location measurement apparatus determines the grade of a second RSSI corresponding to an object which communicates with the second node instead of the first node at step S400.

Furthermore, the location measurement apparatus calculates a range value corresponding to the grade of the second RSSI determined at step S400, and then calculates a second presumed line using the range value at step S500.

At step S600, the location measurement apparatus calculates two presumed regions based on the first presumed line calculated at step S300 and the second presumed line calculated at step S500. Here, the location measurement apparatus restricts coverage using the presumed line and the second RSSI and removes a region in which the object is not present via the restricted coverage, thereby enabling two presumed regions to be calculated.

The location measurement apparatus calculates two presumed locations based on the centers of the two presumed regions at step S700.

The location measurement apparatus estimates the predicted velocity of the object by connecting previous location information and the two presumed locations in a straight line at step S800.

At step S900, the location measurement apparatus calculates the straight-line ranges between the two presumed locations and the previous location of the object, and then calculates a final location using the predicted velocity, estimated at step S800.

As a result, in light of the radio propagation performance of a specific communication system, the present invention may grade a signal RSSI into three levels and provide a location measurement method suitable for each level depending upon the graded strength, thereby noticeably improving the accuracy of the presumed location. In addition, the calculation of a location can be achieved using only two sensing nodes.

The present invention is advantageous in that the location measurement apparatus and method in a defense environment enable the advantages and disadvantages of the range-based method and the range-free method to be integrated and compensated for, and in that the location of an object can be more accurately measured by maximally utilizing the locations of surrounding nodes, the ranges of communication and RSSI information.

Furthermore, the present invention is advantageous in that the accuracy of a presumed location can be considerably improved and a location can be measured using only two sensing nodes because signal RSSIs are graded as three levels in light of the radio propagation performance of a specific communication system and a location measurement method is provided for each level based on the graded RSSI.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A location measurement method, comprising:
   determining a grade of a first received signal strength indication (RSSI) corresponding to an object which communicates with a first node;
   calculating a range of the object from the first node based on the grade of the first RSSI;
   determining a grade of a second RSSI corresponding to the object which communicates with a second node;
   calculating a range of the object from the second node based on the grade of the second RSSI;
   calculating two presumed locations based on the range from the first node and the range from the second node; and
   determining one of the two presumed locations to be a final location of the object by predicting a movement of the object;
   wherein the grade is classified as a first, second or third level based on the RSSI; and
   wherein the first level is a level which allows the range of the RSSI to be directly considered and applied to calculation of the range from the first or second node, and the second and third levels are levels which are used to calculate the range from the first or second node by apply preset ranges.

2. The method of claim 1, wherein the first level has a higher signal strength than the second level, and the second level has a higher signal strength than the third level.

3. The method of claim 1, wherein the calculating two presumed locations comprises:
   calculating two presumed regions by restricting coverage using first and second presumed lines and removing a region in which the object is not present via the restricted coverage; and
   calculating the two presumed locations based on centers of the two presumed regions.

4. The method of claim 1, wherein the determining one of the two presumed locations to be a final location of the object comprises:
   estimating a velocity of the object using previous location information of the object and the two presumed locations; and
   calculating the final location of the object using the estimated velocity of the object.

5. A location measurement apparatus, comprising:
   a first grading unit configured to determine a grade of a first RSSI corresponding to an object which communicates with a first node;
   a first presumed line calculation unit configured to calculate a range of the object from the first node based on the grade of the first RSSI;
   a second grading unit configured to determine a grade of a second RSSI corresponding to the object which communicates with a second node;
   a second presumed line calculating unit configured to calculate a range of the object from the second node based on the grade of the second RSSI;
   a presumed location calculation unit configured to calculate two presumed locations based on the range from the first node and the range from the second node; and
   a final location calculation unit configured to determine one of the two presumed locations to be a final location of the object by predicting a movement of the object;
   wherein the grade is classified as a first, second or third level based on the RSSI;
   wherein the first level is a level which allows the range of the RSSI to be directly considered and applied to calculation of the range from the first or second node, and the second and third levels are levels which are used to calculate the range from the first or second node by apply preset ranges.

6. The apparatus of claim 5, wherein the first level has a higher signal strength than the second level, and the second level has a higher signal strength than the third level.

7. The apparatus of claim 5, wherein the presumed location calculation unit calculates two presumed regions using a first presumed line and a second presumed line, and calculates the two presumed locations based on centers of the two presumed regions.

8. The apparatus of claim 5, wherein the final location calculation unit estimates a velocity of the object using previous location information of the object and the two presumed locations, and determines the final location of the object using the estimated velocity of the object.

* * * * *